United States Patent [19]

Hiroshi

[11] Patent Number: 4,664,479
[45] Date of Patent: May 12, 1987

[54] DYNAMIC SCATTERING, GUEST HOST, NON-GLARING REFLECTOR

[75] Inventor: Itoh Hiroshi, Ohbu, Japan

[73] Assignee: Nippondenso Co., Ltd., Kariya, Japan

[21] Appl. No.: 799,191

[22] Filed: Nov. 18, 1985

Related U.S. Application Data

[63] Continuation of Ser. No. 561,921, Dec. 15, 1983, abandoned.

[30] Foreign Application Priority Data

Dec. 16, 1982 [JP] Japan ................... 57-220787

[51] Int. Cl.$^4$ .................... G02F 1/13; G02B 17/00
[52] U.S. Cl. .................... 350/338; 350/279; 350/349
[58] Field of Search ............... 350/349, 340, 341, 334, 350/338, 279, 278, 283

[56] References Cited

U.S. PATENT DOCUMENTS

| | | | |
|---|---|---|---|
| 3,597,044 | 9/1968 | Castellano | 350/349 |
| 3,734,598 | 5/1973 | Aiken | 350/338 |
| 3,736,047 | 5/1973 | Gelber | 350/339 R X |
| 3,837,730 | 9/1974 | Hatfield et al. | 350/349 |
| 3,864,022 | 2/1975 | Moriyama et al. | 350/349 |
| 3,910,682 | 10/1975 | Arai et al. | 350/340 |
| 4,029,392 | 6/1977 | Moriyama et al. | 350/349 |
| 4,032,219 | 6/1977 | Constant et al. | 350/349 |
| 4,122,027 | 10/1978 | Cole et al. | 350/349 X |
| 4,139,273 | 2/1979 | Crossland et al. | |
| 4,161,653 | 7/1979 | Bedini et al. | |
| 4,196,973 | 4/1980 | Hochstrate | 350/338 |
| 4,266,859 | 5/1981 | Togashi | 350/349 |
| 4,274,713 | 6/1981 | Krueger | 350/331 R |
| 4,431,271 | 2/1984 | Okubo | 350/334 |
| 4,482,427 | 11/1984 | Carr et al. | 350/349 X |

FOREIGN PATENT DOCUMENTS 2009343 3/1980 United Kingdom ............... 350/278

OTHER PUBLICATIONS

Gladstone et al. "Liquid Crystal Display Device Configuration", IBM Technical Disclosure, vol. 15, No. 2, Jul. 1972.
Castellano, "Now That the Heat is Off, Liquid Crystals Can Show Their Colors" Electronics, Jul. 6, 1970, pp. 64–70.
Uchida, "Bright Dichoic Guest-Host LCDs Without a Polarizer" SID Digest, 1980, Apr., pp. 192–193.

Primary Examiner—John K. Corbin
Assistant Examiner—David Lewis
Attorney, Agent, or Firm—Cushman, Darby & Cushman

[57] ABSTRACT

A non-glaring type reflector employing a liquid crystal layer which is composed of a liquid crystal matrix and dichroic coloring matter, which provides a dynamic scattering effect or phase transition effect by applying an electric field. Except on the non-glaring operation, the molecular orientation of the liquid crystal matrix and dichroic coloring matter is uniform to cause a transparent state. On the non-glaring operation, however, the molecular orientation is random, thereby scattering the incident light by the liquid crystal matrix. The scattered light is then absorbed by a dichroic coloring matter to result in a decreased reflectance. The reflectance is controlled by applying a voltage into a liquid crystal layer.

5 Claims, 4 Drawing Figures

DYNAMIC SCATTERING, GUEST HOST, NON-GLARING REFLECTOR

This is a continuation of application Ser. No. 561,921, filed Dec. 15, 1983, which was abandoned upon the filing hereof.

BACKGROUND OF THE INVENTION

1. Field of the Invention

The present invention relates to a reflector with a preventive mechanism against glaring (non-glaring type reflector) which can vary the reflectance thereof electrically.

2. Description of the Prior Art

A non-glaring type reflector which varies the reflectance electrically, has been conventionally known. Such a reflector is provided with a liquid crystal layer on a mirror reflection surface, and a voltage is applied to this liquid crystal layer to control the molecular axis orientation. In this manner, the transmittance or absorption of the light through the liquid crystal layer can be controlled so that the luminous flux reflected by the mirror reflection surface can be controlled. Such types of liquid crystals have been used as n-type nematic liquid crystals which cause dynamic scattering, twist-nematic liquid crystals which control polarization of light, and guest-host type liquid crystals.

However, the conventional reflectors which use the aforementioned types of liquid crystals have the following disadvantages.

Firstly, in the non-glaring type reflector employing a dynamic scattering effect, the image thereof looks slightly opaque on the non-glaring operation because of the light scattering in the liquid crystal caused by the applied voltage.

Secondly, a polarizer or analyzer must be used for the reflector employing twist-nematic or guest-host type liquid crystals to control the polarization of light. Therefore, the light polarized in only one direction is reflected so that the image is dark except on the non-glaring operation. In addition the distorted image is shown, depending on the angle of the driver's eyes to the mirror surface, and the visual angle of the image recognized of the driver is narrow because of the effect by polarizer.

SUMMARY OF THE INVENTION

This invention overcomes the above mentioned problems.

The invention provides a non-glaring type reflector, without using a polarizer, by employing dichroic coloring matter mixed into the liquid crystal layer.

The invention provides a non-glaring type reflector having a clear and dark image which is not opaque during non-glaring operation.

The reflectance is controlled as follows. During non-glaring operation, the scattered light in the liquid crystal matrix is absorbed by the dichroic coloring matter so that the reflectance of the reflector is decreased.

Except on the non-glaring operation, the reflectance of the front surface of the reflector is increased by orientating molecular axis in the direction not to absorb the light.

BRIEF DESCRIPTION OF THE DRAWINGS

The invention will be described in further detail with reference to the accompanying drawings, in which:

FIG. 5 is a cross-sectional view showing an embodiment of the invention wherein the reflection layer also functions as one of the electrodes.

DETAILED DESCRIPTION OF THE PREFERRED EMBODIMENTS

Figure 1:
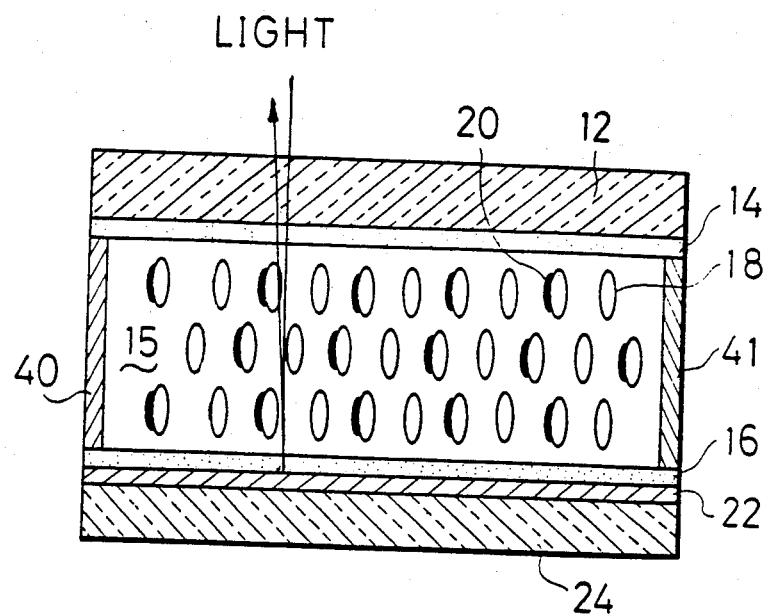
FIG. 1 is a cross-sectional view showing the structure of an embodiment of a non-glaring type reflector according to the present invention.

The non-glaring type reflector according to the present invention is mainly used for a back mirror (rear view mirror) of a vehicle such as an automobile. It effectively protects the driver from dazzlement caused by the light reflection, such as head lamps of a following car at night or sunlight from behind in the daytime.

The available kinds of liquid crystals for the present non-glaring type reflector are nematic liquid crystals, cholesteric liquid crystals and smectic liquid crystals. Generally, an n-type nematic liquid crystal is used to cause dynamic scattering by supplying current through the electrode films on the both sides of liquid crystal layer.

When using the dynamic scattering effect, the electrode film disposed at both end surfaces of the liquid crystal layer is subjected to a surface processing to orient molecules of the liquid crystal in one direction. This causes the liquid crystal layer to be transparent with no electric field because the liquid crystal matrix is a homogeneous configuration or homeotropic configuration and the dichroic coloring matters follow the same configuration. To this liquid crystal layer is applied an electric field above a certain threshold so that the liquid crystal increases the dynamic scattering. Thereby, its configuration becomes irregular and the light passing through the liquid crystal layer is scattered by the liquid crystal matrix. The scattered light is absorbed by the dichroic coloring matters so that the light passing through the liquid crystal layer is decreased, and accordingly, the light reflected on the mirror reflection layer behind the liquid crystal is also decreased. Therefore, the total reflectance at the front surface is lowered resulting in a non-glaring effect.

The dichroic coloring matter used in the present invention has an optical anisotropy. Therefore, the absorption spectrum is different between the linearly polarized light parallel to the molecular axis (i.e. optical axis) and the linearly polarized light transverse to the molecular axis. The light absorption coefficient within a determined spectrum range can be controlled by controlling the molecular axis orientation of such a coloring matter with an optical anisotropy.

In addition a blended liquid crystal of cholesteric and nematic can be employed as a liquid crystal matrix. The aforesaid liquid crystal contains a focal-conic texture and appears slightly opaque and colored in milky white when no electric field is applied. Then a voltage is applied to this liquid crystal so that the liquid crystal changes to a fingerprint texture. The electric field strength is powered up and when it is above a certain threshold, the liquid crystal molecules are oriented in the direction of the applied electric field thereby increasing the twist pitch of cholesteric and causing a phase transition in a nematic liquid crystal in a homeotropic configuration. The molecular axis of the dichroic coloring matter is also oriented in the direction of the electric field. The incident light transmits in the parallel direction of the electric field accompanied with no light absorption. Therefore, the liquid crystal layer becomes transparent when an electric field is applied. At this time, the non-glaring type reflector has a maximum reflectance. On the contrary, the incident light is scattered by the liquid crystal matrix when no electric field is applied. The scattered light is absorbed by the dichroic coloring matter which is in the random orientation of the same focal-ionic texture, thereby darkening the mirror surface.

Such dichroic coloring matter is preferably mixed in 0.3-3% by weight into the liquid crystal matrix having a dynamic scattering effect or a phase transition effect.

FIG. 1 is a cross-sectional view showing the structure of a first embodiment of a non-glaring type reflector. A transparent substrate 12 is made of glass and is disposed at the side which receives incident light. Inside this transparent substrate 12, a transparent electrode film 14 is vapor deposited in a 400-1000 Å thick layer by sputtering. The electrode film 14 is made of indium tin oxide, and to the inner surface of the transparent electrode film 14 is applied octadecyl triethoxy silane. Thus the molecular axis of the liquid crystal is oriented in a homeotropic configuration. On the other substrate 24, which is made of glass, aluminium in a 500 Å thick layer is vapor deposited by sputtering to form a mirror reflection surface 22. On the mirror reflection surface 22, the aforesaid transparent electrode film 16 is vapor deposited in a 400-1000 Å thick layer. The surface of the transparent electrode film is subjected to a surface layer of octadecyl triethoxy silane as described before.

At each peripheral end of the substrates 12 and 24, parallel spacers 40 and 41 made of plastics are attached to define the space wherein the liquid crystal is put. Thus, the liquid crystal layer 15 is disposed in the space between the transparent electrode films 14 and 16. The liquid crystal layer 15 is composed of the dichroic coloring matter 20 1% by weight and an n-type nematic liquid crystal for the balance. For the dichroic coloring matter 20, such blue dye as "D5" produced by BDH Co. and "G-168" produced by NIHON KANKO SHIKISO KK. can be used. For the nematic liquid crystal, MBBA (N-(P-methoxybenzylidene)-P'-butylaniline) is used.

On one surface of the transparent substrate 12, indium tin oxide is sputtered to form a transparent electrode layer. Aluminium is sputtered on one surface of the other transparent substrate 24 to form a mirror reflection layer 16. Each surface of the transparent electrode layers 14 and 16 are subjected to a surface processing to orient the liquid cyrstal in one direction. These substrates are formed to a parallel plate condenser, and the three peripheral side surfaces thereof are fixed with the spacers 40 and 41. Then the substrates shaped in such a condenser are put into vacuum equipment its their inner space a vacuum. An open side thereof is immersed into a liquid crystal mixed with the dichroic coloring matter, and thereafter the liquid crystal is made to permeate into the space between both substrates by applying air pressure.

As shown in FIG. 1, the n-type nematic liquid crystal and the dichroic coloring matter are both in the homeotropic configuration, as in the case of no electric field. The incident light from the transparent substrate 12 is not absorbed in the liquid crystal layers, because any polarization of light is directed vertically to the molecular axis of both the liquid crystal matrix and the coloring matter. Accordingly, the incident light passes through the liquid crystal layer 15 and the transparent electrode layer 16, is reflected by the mirror reflection layer 22 and, then the reflected light passes along the same course to come out of the transparent glass substrate 12. In the case of no electric field, however, the incident light is not absorbed or scattered in the liquid crystal layer. Therefore, the total reflectance of the non-glaring type reflector is high so that a bright and clear image can be obtained.

Figure 2:
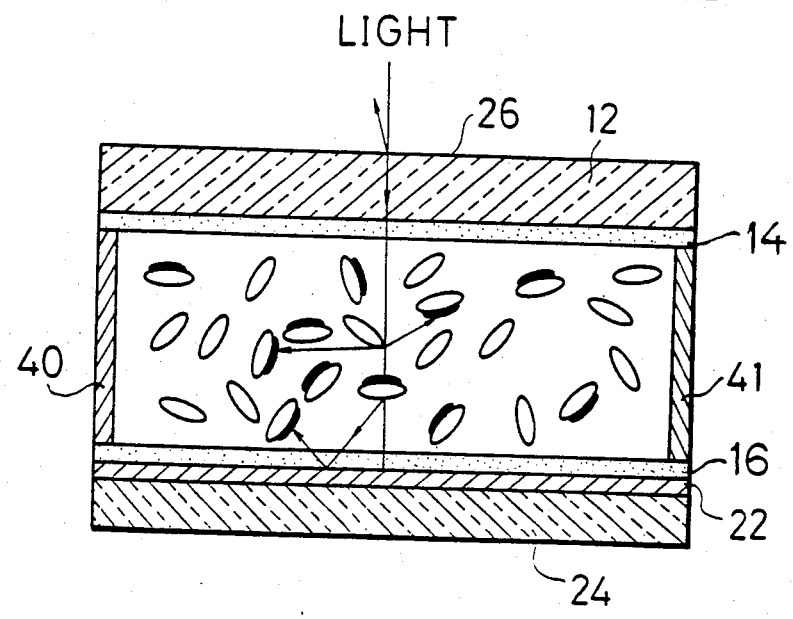
FIG. 2 is a cross-sectional view showing the structure of the same embodiment as FIG. 1, but showing the non-glaring operating state.

When a voltage above a certain threshold is applied between the electrode films, the n-type nematic liquid crystal changes to the dynamic scattering mode, as shown in FIG. 2. In the dynamic scattering mode, the molecular axis orientation of the nematic liquid crystal is random and that of the dichroic coloring matter is also random. Therefore, in this case the incident light from the transparent substrate 12 is scattered by the liquid crystal layer, and the scattered light is absorbed by the dichroic coloring matter. As a result, the luminous flux reaching the mirror reflection layer 22 in the backward direction is decreased, which causes the reduction of the reflected light coming out of the transparent substrate 12 on the front surface of the non-glaring type reflector. When 100% of the incident light passing through the liquid crystal layer is absorbed by the dichroic coloring matter, only the light reflected by the incident surface 26 on the front transparent substrate 12 is reflected by the non-glaring type reflector. Thus, a clear image can be obtained, thereby lowering its brightness. The background of the reflector is not opaque as is a conventional one, but it can be darkened as a whole. The light absorption by the liquid crystal layer can be gradually controlled by successively controlling the voltage around the threshold to cause the dynamic scattering mode. Consequently, the reflectance of the non-glaring type reflector can be gradually varried by changing the applied voltage.

Figure 3:
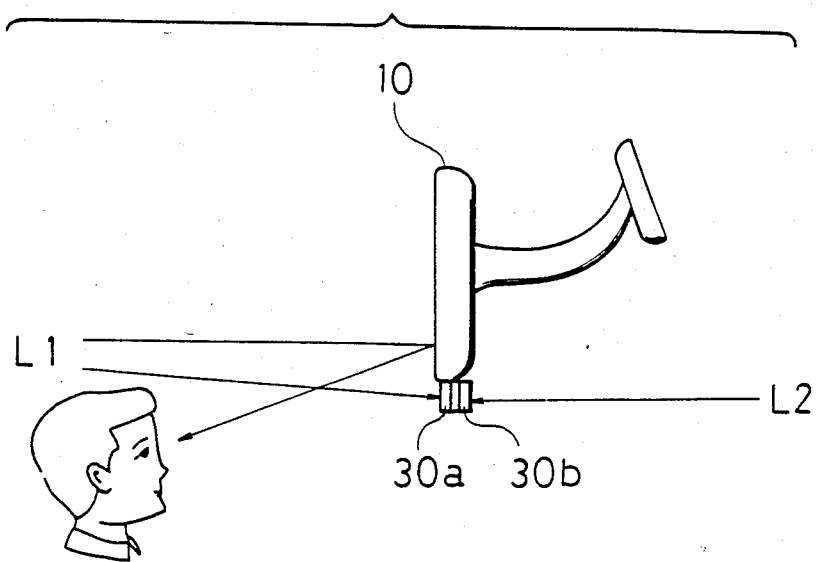
FIG. 3 is an explanatory view showing the mounting state of the non-glaring type reflector of the FIG. 1 embodiment which is used for a rear view mirror in an automobile.

FIG. 3 is an explanatory view showing the mounting state when the aforesaid non-glaring type reflector is used for a rear view mirror in an automobile. A rear view mirror 10 includes a non-glaring type reflector, and photoconductive devices 30a and 30b are disposed at the lower part thereof. The photoconductive devices are made of photodiode, phototransistor, CdS and the like.

Figure 4:
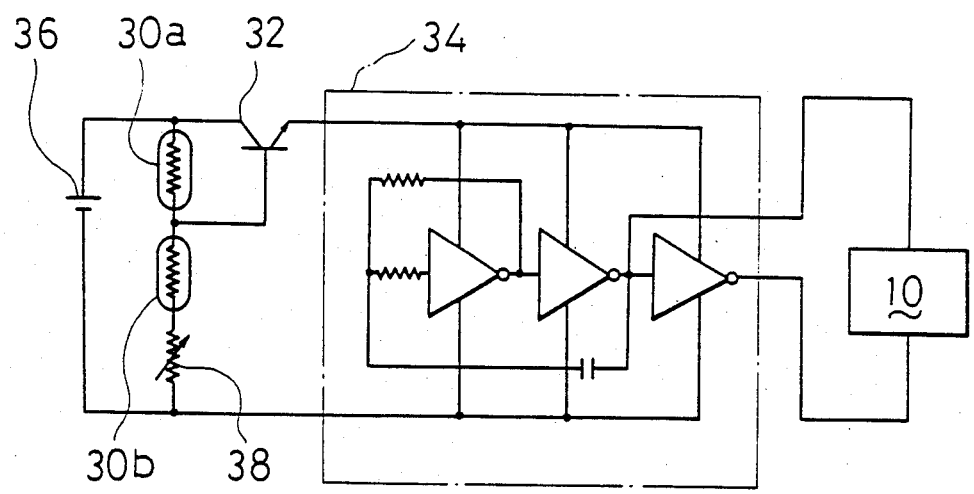
FIG. 4 is a circuit diagram of a controlling circuit to control the reflectance of the non-glaring type reflector of the present invention.

FIG. 4 shows an embodiment of a control circuit. The controller operates to measure the forward brightness and the backward brightness of the reflector, and by applying the voltage to the liquid crystal only when the backward brightness is higher, the non-glaring effect is achieved. The anode of a mounted battery 36 is connected to the collector of a switching transistor 32. The emitter of the switching transistor 32 is connected to the power supply terminal of an inverter forming an oscillator 34. Thus the alternating voltage is applied to both ends of the liquid crystal layer to cause the non-glaring effect. Between the collector and the base of the transistor 32, the photoconductive device 30a made of CdS is disposed to measure backward brightness. Between the base and the earth of the transistor 32, are disposed the photoconductive device 30b made of CdS to measure the forward brightness and a series resistor 38. When the forward light L2 is brighter than the backward light L1, the photoconductive device 30b shows a higher conductivity than that of the photoconductive device 30a, and the resistance of 30a is higher than that of 30b. Thereby the transistor is in the "OFF" state so that the oscillator 34 is not operated. Accodingly, the non-glaring operation is not utilized. In this case, as the forward light is brighter, the driver is used to the forward brightness and is not dazzled by the reflected light.

Conversely, when the backward light L1 is brighter than the forward light L2, the resistance of the photoconductive device 30a is lower than that of 30b. Thus the base voltage of the transistor 32 increases to turn on the transistor 32. The power is supplied to the oscillator 34 from the mounted battery 36 to generate oscillating voltage. By applying this oscillating voltage to the liquid crystal layer of the non-glaring type reflector, the reflectance is decreased resulting in a non-glaring effect. By varying the value of the resistor 38, the threshold to turn on the transistor 32 also can be varied.

The reflectance at the front surface 26 occurring when 100% of the incident light is absorbed in the liquid crystal layer in order to cause the non-glaring effect can be varied by coating the incident surface of the transparent substrate 12 in a certain thickness with such transparent films as $MgF_2$, $ZnS$, and $TiO_2$, which have different dielectric constants from that of the substrate. The reflectance can be also controlled in response to the intensity of the incident light by controlling the applied electric field strength in proportion to the intensity of the incident light.

In the aforementioned embodiment, the transparent electrode film 16 and the mirror reflection surface 22 are separately fomed, but the transparent electrode film and the mirror reflection surface may be combined.

The mirror reflection surface may be placed at the opposite surface on the transparent substrate 24 to that of the transparent electrode layer 16.

An alternative arrangement wherein the reflection layer also functions as one of the electrodes is shown in FIG. 5. Back electrode 39 is reflective.

In effect, the present invention controls the reflectance at the front surface of the non-glaring type reflector which employs the dichroic coloring matter mixed into the liquid crystal matrix. The dichroic coloring matter acts to absorb the scattered light in the liquid crystal layer to decrease the reflectance of the reflector. The reflectance is increased by orienting the liquid crystal matrix and the dichroic coloring matter so as not to absorb the light according to the optical anisotropy.

Accordingly, the present invention can provide such the effect that the image is very clear because it is not opaque and is only darkened by the dichroic coloring matter absorbing the scattered light during the non-glaring state. Also the image is bright, undistorted, and the visual angle thereof is wide during normal operation because a polarizer is not used.

What is claimed is:

1. A non-glaring liquid crystal type mirror arrangement for a rear view mirror of a vehicle, comprising:
    a pair of electrodes;
    a liquid crystal layer, disposed between said electrodes, including a liquid crystal and a transparent dichroic coloring mather and having a uniform molecular axis orientation in the absence of an electric field, said molecular axis orientation being controlled in response to an electric field applied across said electrodes;
    a first transparent substrate placed at a first surface of said liquid crystal layer;
    a second substrate placed at a second surface of said liquid crystal layer, said second substrate including a reflection layer to reflect light incident thereon; wherein:
    said liquid crystal layer is transparent when no electric field is applied such that light incident on said first surface of said liquid crystal layer passes through said first transparent substrate and said liquid crystal layer to said reflection layer and reflects off said reflection layer, the reflected light passing through said liquid crystal layer and said first transparent substrate again; and wherein:
    said liquid crystal exhibits a dynamic scattering effect causing reflected light to be scattered when an electric field is created by applying a voltage between said pair of electrodes such that light incident on said first surface of said liquid crystal layer passes through said first transparent substrate and said liquid crystal layer to said reflection layer and reflects off said reflection layer, the reflected light being scattered by said liquid crystal layer and absorbed by said dichroic coloring matter, said electric field being applied to said electrodes at times necessary to prevent light reflection from said rear view mirror from dazzling the driver of said vehicle.

2. A non-glaring liquid crystal type mirror arrangement according to claim 1, wherein said dichroic coloring matter comprises 0.3-3% by weight of said liquid crystal layer.

3. A non-glaring liquid crystal type mirror arrangement according to claim 1, wherein said uniform molecular axis orientation is perpendicular to said substrate when no electric field is applied.

4. A non-glaring liquid crystal type mirror arrangement according to claim 1, further comprising:
    a photoconductive device for measuring the brightness of light incident on said first surface of said liquid crystal layer; and
    a liquid crystal control circuit for applying said voltage between said electrodes when said photoconductive device has a conductivity greater than a predetermined value.

5. A non-glaring liquid crystal type mirror arrangement for a rear view mirror of a vehicle, comprising:
    a liquid crystal layer including a liquid crystal and a transparent dichroic coloring matter and having a uniform molecular axis orientation in the absence of an electric field, said molecular axis orientation being controlled in response to an applied electric field;
    a first transparent substrate placed at a first surface of said liquid crystal layer;
    a second substrate placed at a second surface of said liquid crystal layer, said second substrate including a reflection layer to reflect light incident thereon, said reflection layer also functioning as a first electrode;
    a second electrode placed at said first surface of said liquid crystal layer adjacent said first transparent substrate; wherein:
    said liquid crystal layer is transparent when no electric field is applied such that light incident on said first surface of said liquid crystal layer passes through said first transparent substrate and said liquid crystal layer to said reflection layer and reflects off said reflection layer, the reflected light passing through said liquid crystal layer and said first transparent substrate again; and wherein:

said liquid crystal exhibits a dynamic scattering effect causing reflected light to be scattered when an electric field is created by applying a voltage between said first and second electrodes such that light incident on said first surface of said liquid crystal layer passes through said first transparent substrate and said liquid crystal layer to said reflection layer and reflects off said reflection layer, the reflected light being scattered by said liquid crystal layer and absorbed by said dichroic coloring matter, said electric field being applied to said first and second electrodes at times necessary to prevent light reflection from said rear view mirror from dazzling the driver of said vehicle.

* * * * *